United States Patent Office 3,135,764
Patented June 2, 1964

3,135,764
SUBSTITUTED 3,5-DIOXOPYRAZOLIDINES AND PROCESS FOR THEIR MANUFACTURE
Bola Vithal Shetty, Rochester, N.Y., assignor to Wallace & Tiernan Inc., Belleville, N.J., a corporation of Delaware
No Drawing. Filed Aug. 14, 1961, Ser. No. 131,116
3 Claims. (Cl. 260—310)

The present invention relates to new derivatives of 3,5-dioxopyrazolidine, corresponding to the general formula:

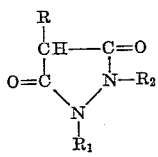

where R means

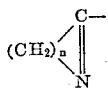

where $n$ can be 3, 4, or 5; $R_1$ means a phenyl radical unsubstituted or substituted by halogen, lower alkyl, lower alkoxy or trifluoromethyl group and $R_2$ means a phenyl radical unsubstituted or substituted by halogen, lower alkyl, lower alkoxy or trifluoromethyl group; or

The compounds of this invention exercise anti-pyretic, analgesic and anti-inflammatory action when administered to animals, including man. The compounds produce general improvement, reduction of swelling and spasticity, and increase mobility coincident with the relief of pain.

The minimum effective single dosage or so-called minimum dosage unit for 1,2-diphenyl-4-[2-(1,2-dehydro) hexamethyleneimino] - 3,5 - dioxopyrazolidine, and like compounds of this invention, in the form of their bases, inorganic or organic non-toxic salts, or resinates, is 20 mgs. (as base). The compounds should ordinarily not be used in more than 2000 mgs. (base) per unit dose in order to avoid toxic hazard.

Suitable salts are the chloride, phosphate, sulphate, citrate, and succinate. Suitable resinates are the sulphonic acid cation exchange resins and the carboxylic acid cation exchange resins having a cation of the aforesaid amine drug adsorbed thereon. The preferred resinates are those made by reacting the amine base with particles of sulphonic acid cation exchange resin.

The compounds may be used alone or with any of the well-known, non-toxic pharmaceutically acceptable fillers, excipients, and the like. The compounds can be orally administered in the form of tablets, capsules, or suspensions.

The compounds of this invention can be made by reacting an alkoxy lactim or bromopyridine with a 1,2-diphenyl 3,5-dioxopyrazolidine.

The following illustrates the reactions taking place:

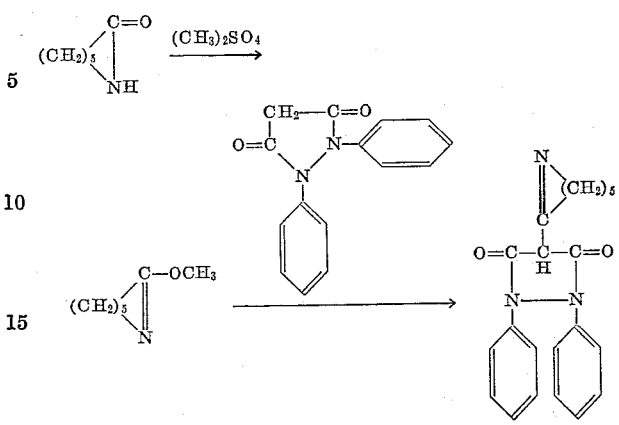

The following example illustrates the invention:

EXAMPLE 1

Five grams of O-methyl caprolactim (C.A. 70, 6749e (1948) was treated with 10.0 grams of 1,2-diphenyl-3,5-dioxopyrazolidine and heated in an oil bath at 150–160° C. for 8 hours. The reaction mixture was cooled and washed with three 50 cc. portions of petroleum ether. The solid product was crystallized from methanol.

9.5 grams of $C_{21}H_{21}N_5O_2$ (1,2-diphenyl-4-[2-(1,2-dehydro) hexamethyleneimino] 3,5-dioxopyrazolidine) having a melting point of 213–14 was obtained. This compound is an effective and safe anti-arthritic.

EXAMPLE 2

Five grams of 2-bromopyridine was treated with 7.8 grams of 1,2-diphenyl 3,5-dioxopyrazolidine in the presence of an alkaline condensing agent like sodium methoxide and refluxed for 8 hours. The solid product was crystallized from methanol. It has the formula:

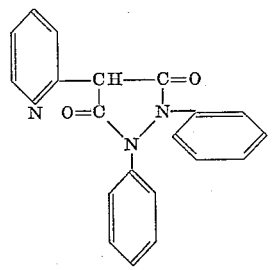

and was an effective and safe anti-arthritic.

The basic dioxopyrazolidine derivatives prepared in accordance with this invention can also form simple addition salts with acids by crystallizing the basic compound with an acid such as hydrochloric, sulphuric, phosphoric, citric, malic, succinic, or the like, and can form resinates which are complex addition salts by stirring the base compound with an aqueous suspension of particles of an acid resin, such as a sulphonic acid cation exchange resin, for example Amberlite IR–120 or a carboxylic acid cation exchange resin such as IRC–50.

By similar procedures well-known to the art various other derivatives coming under the general formula set forth above can be made.

The following table shows a number of other suitable anti-arthritic compounds coming under the general formula:

*Table I*

Compound of general formula:

$$R-CH-C=O$$
$$O=C\quad N-R_2$$
$$\quad\backslash N/$$
$$\quad\ R_1$$

where

| R | $R_1$ | $R_2$ |
|---|---|---|
| (CH₂)₅-C(=N)- | $C_6H_5$ | $C_6H_5$ |
| (CH₂)₄-C(=N)- | $C_6H_5$ | $C_6H_5$ |
| (CH₂)₃-C(=N)- | $C_6H_5$ | $C_6H_5$ |
| (CH₂)₅-C(=N)- | $C_6H_5$ | C₆H₄-OCH₃ |
| (CH₂)₄-C(=N)- | $C_6H_5$ | C₆H₄-OCH₃ |
| (CH₂)₃-C(=N)- | $C_6H_5$ | C₆H₄-OCH₃ |
| (CH₂)₅-C(=N)- | $C_6H_5$ | C₆H₄-CH₃ |
| (CH₂)₄-C(=N)- | $C_6H_5$ | C₆H₄-CH₃ |
| (CH₂)₃-C(=N)- | $C_6H_5$ | C₆H₄-CH₃ |
| (CH₂)₅-C(=N)- | $C_6H_5$ | C₆H₄-Cl |
| (CH₂)₄-C(=N)- | $C_6H_5$ | C₆H₄-Cl |
| (CH₂)₃-C(=N)- | $C_6H_5$ | C₆H₄-Cl |
| (CH₂)₅-C(=N)- | $C_6H_5$ | pyridyl |

*Table I—Continued*

| R | $R_1$ | $R_2$ |
|---|---|---|
| (CH₂)₄-C(=N)- | $C_6H_5$ | pyridyl |
| (CH₂)₃-C(=N)- | $C_6H_5$ | pyridyl |
| (CH₂)₅-C(=N)- | $C_6H_5$ | C₆H₄-CF₃ |
| (CH₂)₃-C(=N)- | $C_6H_5$ | C₆H₄-Br |
| (CH₂)₃-C(=N)- | C₆H₄Cl | $C_6H_5$ |
| (CH₂)₃-C(=N)- | $C_6H_5$ | C₆H₄-F |

This application is a continuation of my copending application Serial No. 847,697, filed October 21, 1959, now abandoned.

I claim:

1. A member selected from the group consisting of compounds of the formula:

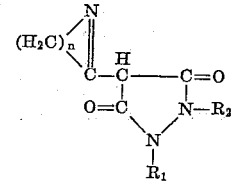

where $n$ is an integer from 3 through 5; $R_1$ represents a member selected from the group consisting of phenyl and phenyl substituted by a member selected from the group consisting of halogen, lower alkyl, lower alkoxy, and trifluoromethyl groups; and $R_2$ represents a member of the group consisting of

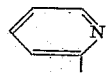

phenyl and phenyl substituted by a member of the group consisting of halogen, lower alkyl, lower alkoxy, and trifluoromethyl groups; and therapeutically acceptable acid addition salts thereof.

2. The compound 1,2-diphenyl - 4 - [2-(1,2-dehydro) hexamethyleneimino]-dioxopyrazolidine.

3. The non-toxic acid addition salt of the compound of claim 2.

References Cited in the file of this patent

UNITED STATES PATENTS

| | | |
|---|---|---|
| 2,700,670 | Haflinger | Jan. 25, 1955 |
| 2,835,677 | Haflinger et al. | May 20, 1958 |
| 2,859,211 | Pfister et al. | Nov. 4, 1958 |